July 21, 1959 W. P. CASEY, JR., ET AL 2,895,810
APPARATUS FOR REGENERATING SPENT WATER SOFTENING AGENTS
Filed Aug. 30, 1957
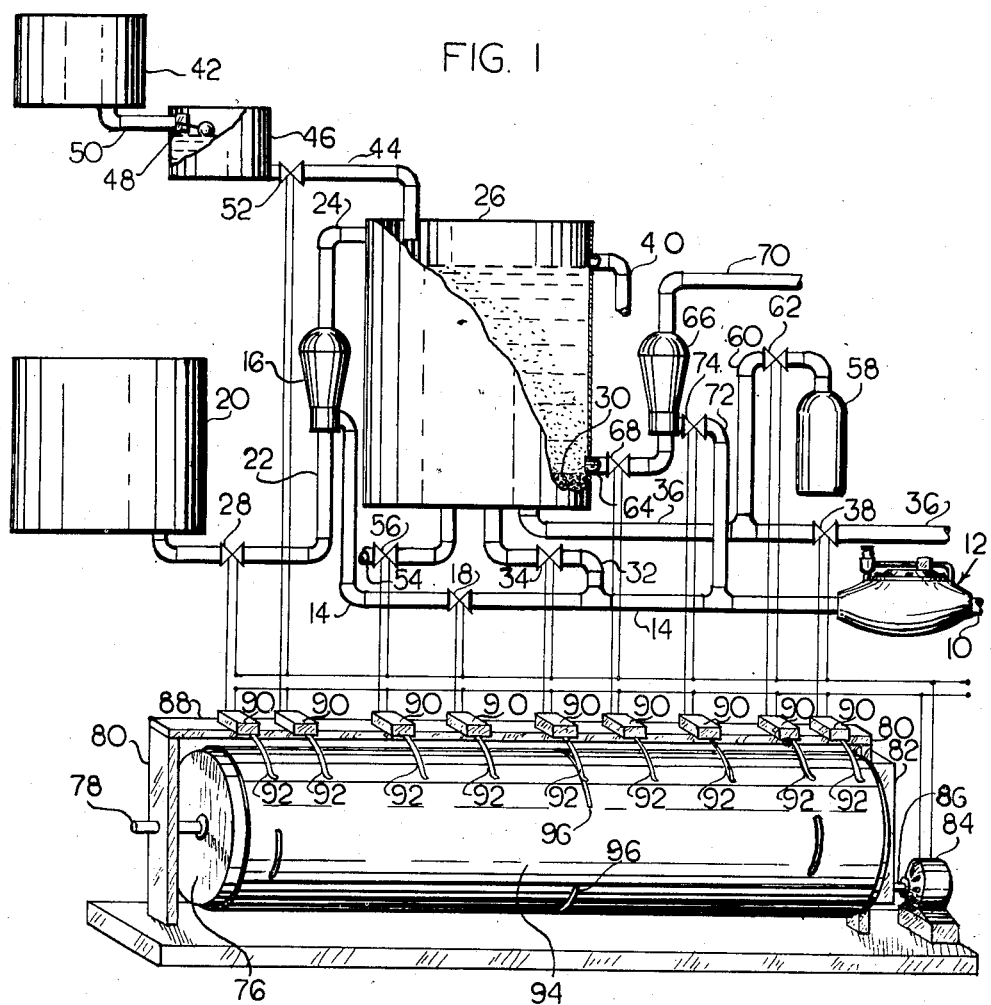
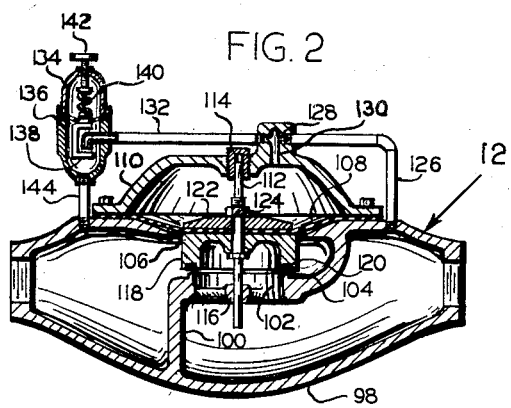
INVENTORS
WALTER P. CASEY, JR.
LEWIS E. CASCADDEN
LUTHER L. LAWSON
BY
AGENT

2,895,810

APPARATUS FOR REGENERATING SPENT WATER SOFTENING AGENTS

Walter P. Casey, Jr., Paradise Valley, Lewis E. Cascadden, North Las Vegas, and Luther L. Lawson, Las Vegas, Nev., assignors to Pier Inc., Las Vegas, Nev., a corporation of Nevada Application August 30, 1957, Serial No. 681,380

4 Claims. (Cl. 23—285)

This invention relates to an improvement in apparatus for regenerating spent water softening agents such as natural and artificial zeolites and ion exchange resins.

As is well known the general process for regenerating spent water softening agents of the ion exchange type involves treatment with a sodium chloride solution. This replaces the calcium and magnesium, extracted from hard water during the softening process, with sodium to restore the capacity of the softening agent to soften additional hard water. Additionally the treating agent is washed and purified to provide clean active agent for re-use.

The regeneration process as heretofore carried out has involved manual control of the various steps. Time and proper proportions of water, brine and treating agent are important in certain stages. This has resulted in a laborious, expensive and uneconomical process subject to human errors and lack of rigid control.

It is therefore the object of this invention to provide improved apparatus for performing and controlling a regenerating process for spent water softening agents. Another object of this invention is to provide apparatus for more economically and efficiently regenerating water softening agents. Yet another object of this invention is to provide apparatus for automatically controlling the process of regenerating such agents. These and other objects of the invention will be apparent from the following description thereof and from the annexed drawings in which:

Figure 1 is a general layout view of apparatus embodying features of this invention.

Figure 2 illustrates, in section, a type of constant pressure valve useful in controlling the flow of water in the regeneration system.

Referring now to Figure 1, a suitable water supply, such as a city main or other convenient source (not shown), is connected through pipe 10 to a constant output pressure valve 12. This valve is an important element in the apparatus of this invention and for that reason will be described hereinafter in more detail. The output from valve 12 is connected through pipe 14 to water injector pump 16, the flow therethrough being controlled by an electrically operated valve such as solenoid valve 18. Such pumps are convenient for pumping resin-water mixtures, are of conventional design and are commercially available. Pump 16 draws spent resin-water mixture from tank 20 through pipe 22 and pumps it through pipe 24 into treatment tank 26 at or near its top. The spent resin in tank 20 may be accumulated in storage there, or may be dumped from individual small tanks employed in water softening units. The flow of resin water mixture from tank 20 to pump 16 is controlled by an electrically actuated valve such as solenoid valve 28.

Treatment tank 26 may be of any conventional and suitable design. Preferably it is provided with a filter bed 30 in its bottom, composed conveniently of sand or other inert subdivided material. Water for washing resin transferred to tank 26 is supplied through pipe 32 which connects with pipe 14, the flow through pipe 32 being controlled by solenoid valve 34. Air is supplied for aeration of the resin in tank 26 from a suitable compressor or other source (not shown) through pipe 36 into the bottom of tank 26, the airflow through pipe 36 being controlled by solenoid valve 38. Since, as will be apparent, the flow of wash water entering tank 26 through pipe 32 is upward, an overflow drain pipe 40 is provided at a suitable level near the top of tank 26.

After washing, the spent resin in tank 26 is treated with a brine (NaCl solution) advantageously made up or stored in elevated tank 42, and the brine is conveniently supplied to tank 26 through pipe 44 which leads from constant level tank 46 equipped with float valve 48 supplied with brine from tank 42 through pipe 50. The flow of brine through pipe 44 is controlled by solenoid valve 52, the resin itself being retained in the tank by action of filter bed 30. After the brine has contacted the resin in tank 26 it may be dumped through bottom drain pipe 54 the flow through this pipe being controlled by solenoid valve 56. After brine treatment and further washing, the resin in tank 26 may be chlorinated as by transfer of chlorine gas or chlorine containing solution from container 58 through pipe 60 which may be connected to pipe 36 on the tank side of solenoid valve 38. The flow through pipe 60 is controlled by solenoid valve 62.

Fully regenerated resin is pumped out of tank 26 through pipe 64 which enters the tank conveniently above the top level of filter bed 30, the flow from the tank through pipe 63 to water injector pump 66 being controlled by solenoid valve 68. The regenerated resin water mixture is discharged by pump 66 through pipe 70 which may be connected to a suitable storage tank or individual resin container tanks (not shown). Water for actuation of pump 66 is supplied from the constant pressure valve 12 through pipe 14 and then through connecting pipe 72, the water flow through pipe 72 to pump 66 being controlled by solenoid valve 74.

The automatic timing and control organization is shown in the lower portion of Figure 1 and is relatively greatly enlarged to show with clarity the details thereof, and also to provide for ready tracing of the electrical control circuits to the various solenoid valves. It comprises an elongated drum 76 which is suitably mounted for rotation on axial shaft 78 which in turn revolves in suitable bearing apertures in vertical brackets 80. One extending end of shaft 78 is connected to reduction gear 82 which is in turn actuated by synchronous or clock type electric motor 84 through stub shaft 86.

Spanning the top of brackets 80 is fixedly attached shelf 88 which is conveniently spaced apart from the surface of drum 76. Mounted on shelf 88 are a series of micro-switches 90, one switch being provided for each of the solenoid valves in the apparatus illustrated in the upper portion of Figure 1, and to which each is electrically connected. Actuating each switch is finger 92 extending therefrom, whose free end is adapted to feel the surface of a card or plate 94 wrapped around and detachably affixed to the periphery of drum 76. In alignment with the ends of fingers 92, as the drum 76 and card 94 rotate, are slots 96 in the card 94 which are so located and of such length as to actuate each of the switches 90 on and off at the desired time and for the desired interval that corresponding actuation is desired in the solenoid valve to which each is electrically connected. As an example, the device as illustrated in Figure 1 shows fingers on the micro-switch connected to solenoid valve 34 engaged in its slot in card 94 and valve 34 is open with wash water through pipe 32 entering tank 26. All other valves are closed.

Each solenoid valve has one direct connection to a lead of a suitable source of electric power, the other connection to each valve being through its corresponding micro-switch and thence to the other lead of the power source. Power for electric motor 84 may also be tapped from the same source substantially as shown.

Referring now to Figure 2, a type of valve 12, suitable for controlling the supply of water to the various units combined in the apparatus of this invention comprises a hollow body 98 which is divided longitudinally by septum 100. Septum 100 has an orifice 102 in a horizontal portion thereof surrounded by an upturned flange forming seat 104. The top of body 98 has an opening 106 which is covered by flexible diaphragm 108. Hollow bonnet 110 is firmly bolted to the top of body 98, covering the outer edges of diaphragm 108 and maintaining it firmly in position sealing opening 106. Movable stem 112 transfixes diaphragm 108 and is maintained in vertical alignment by upper bearing 114 and lower bearing 116. Fixedly attached to stem 112 is disc member 118 which is provided around its bottom with sealing gasket 120 adapted to mate with seat 104 when the stem 112 and the disc assembly are in lowest position, thereby closing the orifice 102 and stopping flow through the valve. Disc 118 is conveniently maintained in firm engagement with diaphragm 108 by provision of sealing washer 122 tightened as by nut 124. From the inlet side of the septum 100 in the valve body 98, leads small pipe 126 which is connected to restriction 128 which in turn communicates with return pipe 130 which is let into the plenum in the bonnet 110 above the diaphragm 108. Control pressure pipe 132 also communicates with the outlet of restriction 128 and leads to a pilot valve formed of hollow body 134 divided horizontally by diaphragm 136. The outflow from pipe 132 in the pilot valve is controlled by closure member 138 which is attached to the lowered side of diaphragm 136 and is biased by spring 140 above diaphragm 136. The degree of tension of spring 140 may be set by connected adjusting screw member 142. The outlet from the pilot valve flows through pipe 144 back to the interior of valve body 98 on the outlet side of septum 100.

It will be apparent that the position of disc 118 to control the flow through orifice 102 is controlled by the pressure admitted through pipe 130 onto the comparatively large surface area of the top of diaphragm 108. The amount of pressure in pipe 130 is precisely controlled by the setting of the pilot valve controlling the bleed off through pipe 132. The output pressure acts through pipe 144 and controls the outflow through pipe 132 by pressure on diaphragm 136 to raise or lower the closure member 138 against the set tension of spring 140. Therefore any desired output pressure may be maintained from valve 12 irrespective of the flow therethrough.

As will be noted, employment of constant pressure valve 12 provides a wash water supply and pumping capacity which can be regulated and controlled on a time basis. Surprisingly the water injector pumps move an accurate volume of liquid during a time interval providing they are actuated by a constant pressure water supply.

In operation, the apparatus of this invention produces completely automatic control of the entire regeneration process. In the following description of a typical cycle the ion exchange material is referred to as resin, it being understood that other materials, such as zeolites, having similar water softening properties may also be treated. Tank 20 will contain spent resin which it is desired to regenerate. Individual tanks containing spent resin may be dumped therein or tank 20 may be a used resin storage unit in the water softening circuit which itself forms no part of this invention. Card 94, on drum 76 which is slowly revolved, is arranged with suitable slots 96 to provide for actuation of corresponding micro-switches 90 to open solenoid valves 28 and 18 to start pump 16 and transfer used resin and water out of tank 20 through pipe 22 and into treatment tank 26 through pipe 24. The length of time these valves are open is depetermined by the characteristics of pump 16 and the required volume to be transferred and corresponding length slots 96 are employed to maintain these valves open for such time, and then to close them. The spent resin is now in the treatment tank. Then valve 34 is opened by a slot 96 in card 94 to wash the resin. The pipe line 32 feeding wash water is of such diameter, or may be suitably throttled to provide the required upward flow of wash water so that spent resin will remain in tank 26 and the wash water will overflow through drain 40. After the required wash period valve 34 is closed and the slot 96 which actuates the micro-switch to open valve 38 comes into engagement with the corresponding finger and the resin is aerated for a short time. This valve then closes and valve 56 is automatically opened to drain wash water from the resin which is retained in the tank by filter bed 30. Then valve 52 is opened for a period of time to allow the required amount of brine to flow into tank 26 from brine tank 42 through constant head tank 46. The brine solution contacts the resin to effect the ion exchange and regeneration, and flows out of the bottom of the tank through drain pipe 54 and valve 56, the resin being retained in the tank as hereinbefore described by filter bed 30. If desirable or necessary during this step air valve 38 may be opened to provide agitation. After valve 52 has been shut off and the brine drained from the resin, another wash is introduced by opening valve 34 for the required time period and valve 56 may then be closed. Following washing, valve 62 is opened for a short time to introduce chlorine into the contents of tank 26 to further purify the resin for sanitary reasons and subsequently if advantageous valve 34 may be opened again for a short rinse period. All these operations are automatically controlled by suitably placed and sized slots in card 94. The resin is now regenerated and valves 68 and 74 now open for sufficient time to pump the regenerated resin out of treatment tank 26 through pipe 70 into a storage tank or other container or containers (not shown) for reuse.

It will be understood that the timing device and the electrically actuated valves controlled thereby and the water injector pumps which transfer ion exchange resin in and out of the treatment tank, provide in combination with the constant pressure water supply valve, an automatic system for controlling and operating a complete regeneration cycle. The pumps and the wash water control involve a water supply for operation and it is a unique factor of this invention that employment of a constant pressure water supply valve enables all operations in the regeneration cycle to be placed on a relative time basis. The timing device therefore provides close and advantageous control of each unit operation to provide the proper volumes and flows at the required intervals. It will further be understood that the combination of apparatus described for controlling the transfer of ion exchange material in and out of the treatment tank and the flow of wash water and brine, may be employed with various types or sizes of treatment tank and other auxiliary equipment. The characteristics of the control system may readily be adjusted to provide for proper operation. In addition the principles of this invention may be employed in apparatus for regenerating spent ion exchange material by a process which may be modified somewhat from that described herein and which serves as an example of the basic steps involved.

We claim:
1. In apparatus for regenerating spent ion exchange material in which said material is treated with brine and wash water in a treatment tank, the combination which comprises; water injector pumping means for transferring spent material into said tank and regenerated material out of said tank, means for introducing wash water into said tank, means for introducing brine into said tank, electri- cally actuated valves controlling said pumping means and said wash water and brine introduction means, a timing device to actuate said valves at times and for intervals during a regeneration cycle, and a constant pressure valve controlling the water supply to said pumps and wash water introduction means.

2. In apparatus for regenerating spent ion exchange material in which said material is treated with brine and wash water in a treatment tank, the combination which comprises; water injector pumping means for transferring spent material into said tank and regenerated material out of said tank, means for introducing wash water into said tank, means for introducing brine into said tank, solenoid valves controlling said pumping means and said wash water and brine introduction means, a timing device to actuate said valves at times and for intervals during a regeneration cycle, and a constant pressure valve controlling the water supply to said pumps and wash water introduction means.

3. In apparatus for regenerating spent ion exchange material in which said material is treated with brine and wash water in a treatment tank, the combination which comprises; water injector pumping means for transferring spent material into said tank and regenerated material out of said tank, means for introducing wash water into said tank, means for introducing brine into said tank, solenoid valves controlling said pumping means and said wash water and brine introduction means, a timing device, including micro-switches, to actuate said valves at times and for intervals during a regeneration cycle, and a constant pressure valve controlling the water supply to said pumps and wash water introduction means.

4. In apparatus for regenerating spent ion exchange material in which said material is treated with brine and wash water in a treatment tank, the combination which comprises; water injector pumping means for transferring spent material into said tank and regenerated material out of said tank, means for introducing wash water into said tank, means for introducing brine into said tank, electrically actuated valves controlling said pumping means and said wash water and brine introduction means, a rotating drum timing device to actuate said valves at times and for intervals during a regeneration cycle, and a constant pressure valve controlling the water supply to said pumps and wash water introduction means.

References Cited in the file of this patent

UNITED STATES PATENTS

| | | |
|---|---|---|
| 2,098,893 | Staegemann | Nov. 9, 1937 |
| 2,503,901 | Chace | Apr. 11, 1950 |